March 31, 1936. F. H. PEEK 2,035,716
HAY DRIER
Original Filed March 10, 1932  2 Sheets-Sheet 1
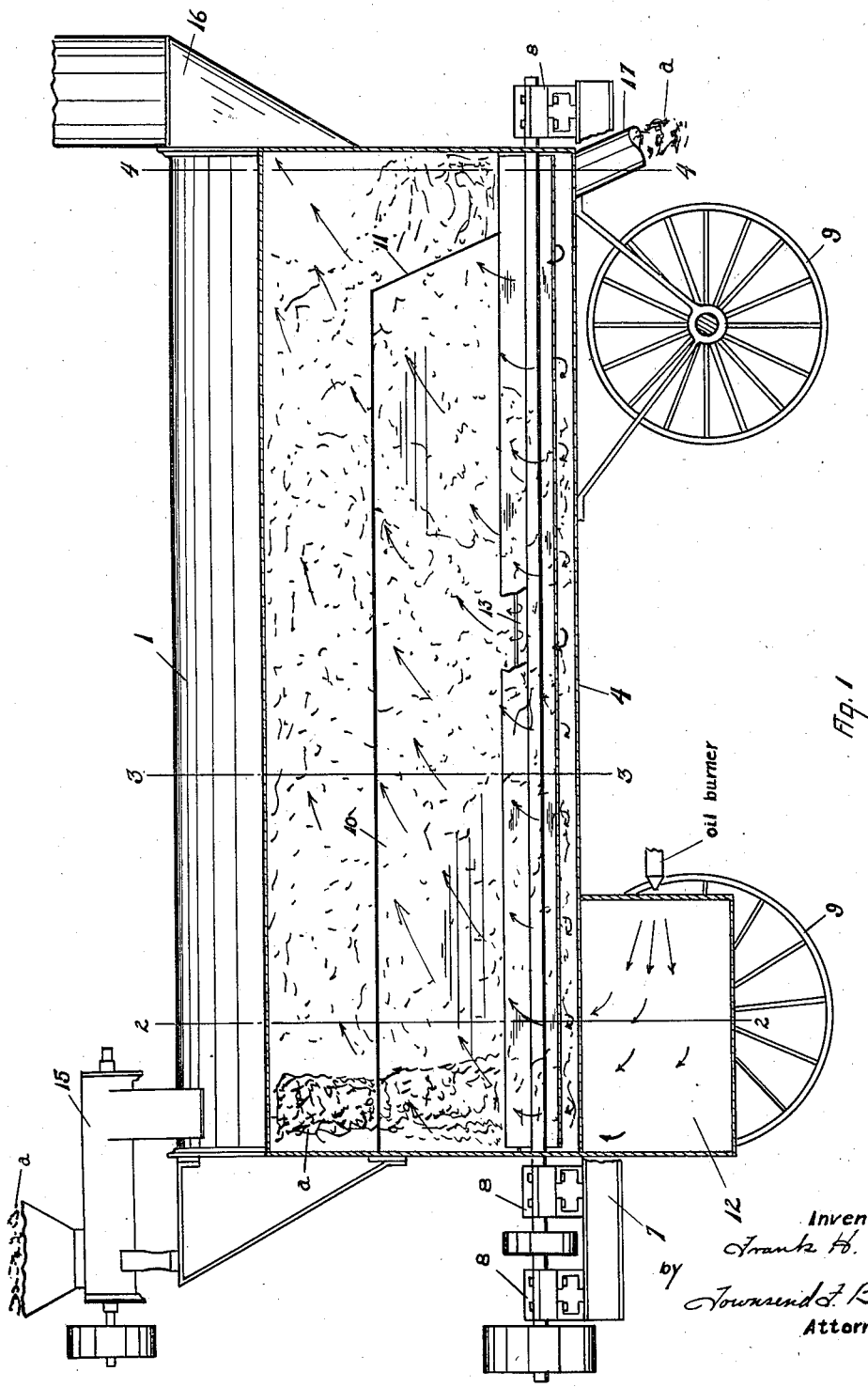
Inventor
Frank H. Peek
by
Townsend F. Beaman
Attorney March 31, 1936.                F. H. PEEK                   2,035,716
                                HAY DRIER
                Original Filed March 10, 1932    2 Sheets-Sheet 2
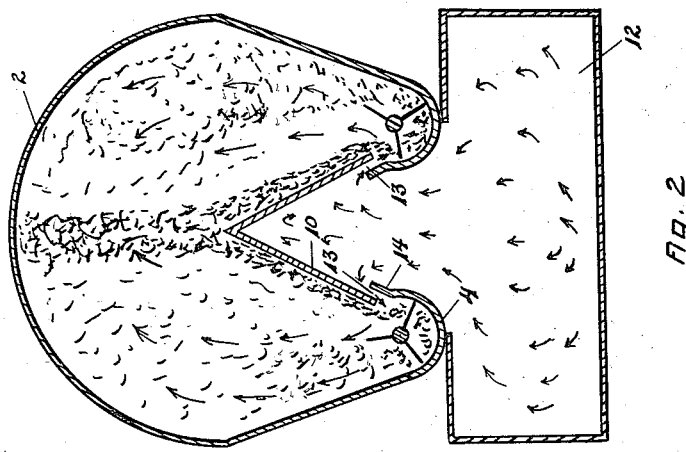
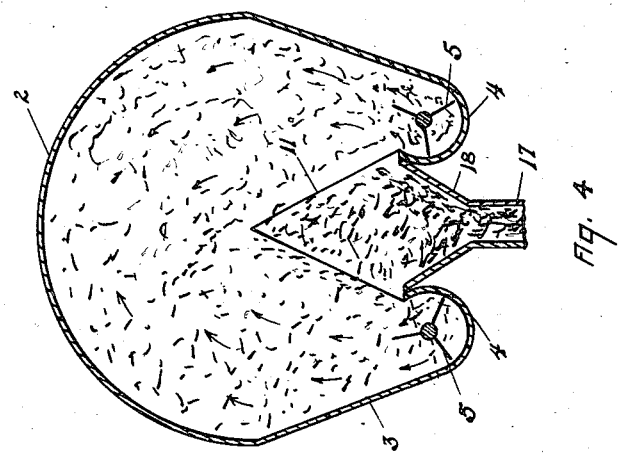
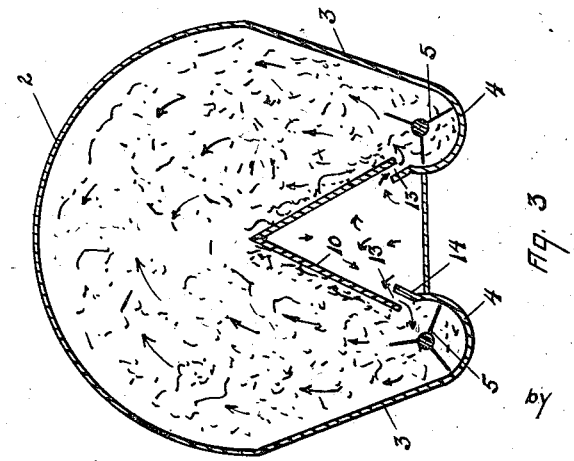
Inventor
Frank H. Peek
by Townsend F. Beaman
Attorney Patented Mar. 31, 1936

2,035,716

UNITED STATES PATENT OFFICE 2,035,716

HAY DRIER

Frank H. Peek, Jackson, Mich.

Application March 10, 1932, Serial No. 598,037
Renewed August 30, 1935

10 Claims. (Cl. 34—44)

My invention relates to a drying apparatus and more particularly to a drying apparatus for hay or similar products.

It is a purpose of my invention to provide a drying apparatus for drying uncured hay or similar material so that the color and food value of the green hay may be maintained in the dry state. In the usual method of curing and drying hay and similar material it is difficult to maintain any uniformity in results because of the uncertainty of the heat of the sun used to do the drying and the detrimental effect of rain upon the product during the process of drying. The greater percentage of food value resides in the leaves of the hay and in making hay in the conventional manner, a large percentage of the leaves is wasted during handling. In carrying out my invention the hay or similar material in a green uncured state, is cut up into relatively short lengths in a cutting or chopping machine, similar to those employed to produce ensilage, prior to being introduced into the drying apparatus.

My improved drying apparatus for drying hay or similar material comprises an elongated housing forming a horizontal chamber into which the short lengths of hay are introduced by a screw conveyor. Within the housing, I have provided an inverted V-shaped hot gas flume which conducts and introduces fresh hot gas into the housing throughout substantially the entire length. Two troughs are provided in the bottom of the housing adjacent the flume and they are equipped with agitators to maintain the cut hay in substantially continuous suspension in the chamber as it is traversed therethrough.

It is particularly a purpose of my invention to provide a drying apparatus in which the heated gases are introduced throughout the greater portion of the drying chamber with the result that the gases may carry off the moisture present in the uncured hay more effectively and with greater rapidity.

It is a further purpose of my invention to provide a drying apparatus in which the heated gases directly cooperate with the agitator to aid in maintaining the cut hay in substantially continuous suspension and at the same time slowly propel the hay through the apparatus. This is accomplished by discharging the heated gases through longitudinal slots directed into the troughs containing the agitators. The drying chamber is equipped with a stack at the end opposite the feeding hopper providing a draft for the heated gases in which the cut hay is suspended by the agitators and slowly advanced to a zone of quiet from which the cut hay is withdrawn from the chamber. The rate of advancement of the hay through the chamber may be regulated by a damper in the stack.

Other objects and advantages of my invention will appear as the description of the invention proceeds. It is to be distinctly understood, however, that I do not intend to limit myself to the exact details shown or described but that I intend to include as a part of my invention, all such obvious changes and modifications of parts as would occur to those skilled in this art and would fall within the scope of the claims.

In the drawings:

Fig. 1 is a side elevation of my improved drying apparatus with a substantial portion shown in cross sections taken on line 1—1 of Fig. 2.

Fig. 2 is a cross sectional view of my improved drying apparatus taken on line 2—2 of Fig. 1.

Fig. 3 is a view similar to Fig. 2 taken on line 3—3 of Fig. 1.

Fig. 4 is a view similar to Fig. 2 taken on line 4—4 of Fig. 1.

Referring in detail to the drawings:

My improved drying apparatus comprises a housing 1 preferably made up of a semi-cylindrical upper portion 2 and a lower portion 3 having conveying walls terminating in troughs 4. Three bladed agitators 5 are located in each trough 4 being journaled in the framework 7 in suitable bearings 8. The framework 7 supports the housing 1 and may be mounted upon wheel 9 as shown in Fig. 1 to provide a portable apparatus.

Within the housing 1, I have provided an inverted V-shaped hot gas flume 10 which abuts the left end of the housing 1 as shown in Fig. 1 and has a closed inclined end 11 at the right end of the housing 1; the closed inclined end 11 acts as a discharge chute as will be hereinafter described.

An oil burner of the usual type is shown in Fig. 1 positioned beneath the housing 1 operatively associated with a combustion chamber 12. The heated gases of combustion pass upward from the chamber 12 into the flume 10 as is shown in Fig. 2, the flume 10 together with a baffle base plate 12' extending between the troughs 4 throughout the length of the flume 10 except directly above the chamber 12 completely confining the gases except as escape is provided through longitudinal slots 13 formed by lower edges of the flume 10 and converging flanges 14 of the troughs 4. The horizontal slots 13 extend throughout the length of the flume 10 and are preferably uniformly graduated in width to provide a uniform flow of heated gases there through throughout the entire length of the slots. The agitating paddles 5 are rotated inwardly, by any suitable means, thus preventing any of the cut hay from being thrown into the slots 13 to clog the same.

A hopper 15 is provided at one end of the housing 1 into which the cut hay may be placed. The hopper 15 is preferably equipped with a screw feed to prevent the heated gases from leaving the housing 1 through the hopper 15. At the opposite end of the housing 1 a stack 16 is provided having a damper (not shown) which may be manually or automatically operated to regulate the traverse of the cut hay through the drying chamber as will be hereinafter described. Below the stack 16, in a zone of quiet a discharge outlet 17 is provided consisting of a funnel shaped throat 18 formed as a continuation of the closed inclined end portion 11 as is shown in Fig. 4.

The housing 1, flume 10 and chamber 12 are preferably of sheet metal and may be covered with heat insulating sheet to reduce the heat loss. The various units may be assembled in any well known manner.

The operation of my improved drying apparatus is as follows:

Hot gases of combustion pass from the chamber 12 as indicated by the arrow upward into the flume 10 completely filling the same and pass out into the drying chamber through the entire length of the slots 13 with a uniform flow. As the gases enter the drying chamber the draft of stack 16 carries the gases forward as indicated by the arrows. The uncured cut hay $a$ is placed in the hopper 15 and is fed by the screw feed into the drying chamber being separated by the flume into substantially equal portions as shown in Fig. 2 and gravitating into the trough 4 where it is thrown into the heated chamber in a widely dispersed manner and carried slightly forward by the draft of the gases. The suspended hay falls and is again gravitated into the trough 4 by the sharp inclination of the flume 10 and the walls 3. Again the hay is thrown into the chamber by the agitators and slightly advanced by the draft of the gases. This operation continues until the cut hay is thrown by the agitator into the zone of quite at the right end of the housing where it is discharged by gravitation through the dust collector 17. In the event that the draft is not sufficient to traverse the material being dried and agitated, screw propellers or the like may be substituted for the paddles 5 to advance the material slightly forward each revolution as it is thrown into the heated chamber. When the material being dried is of a character capable of being advanced by the draft alone the rate of advancement may be regulated by a damper in the stack 16.

From the foregoing description it will be apparent that I have provided an improved apparatus for dehydrating hay and similar material in which the hay is maintained in substantially continuous suspension while being subjected to fresh unsaturated hot gases throughout the entire traverse of the apparatus. The hot gases emitted from the horizontal slots pass upwardly and forwardly through the agitated material, removing the moisture from the material as they move toward the dome and stack of the housing. As a result of this structure, the material is being subjected to fresh dry gases at all times during the drying operation. Furthermore, the flume employed to convey the hot gases throughout the length of the housing acts as a distributor for the material and presents a heated surface over which the material slides.

What I claim as new and desire to be protected by Letters Patent is:

1. A drier of the character described comprising an elongated housing, an inverted V-shaped flume centrally located within said housing, troughs constituting the bottom of said housing located adjacent and on opposite sides of said flume, elongated slots formed by said flume and troughs, agitating devices mounted in said troughs, means for admitting heated gases to said flume, means for providing upwardly and forwardly passage of gases through said slots, and means for admitting and removing material to be dried.

2. A drier of the character described comprising an elongated housing, a flume centrally located within said housing adapted to convey hot gases substantially the entire length of said housing, troughs constituting the bottom of said housing located adjacent and on opposite sides of said flume, elongated slots formed by said flume and troughs, agitating devices mounted in said troughs, means for admitting heated gases to said flume, means for providing upwardly and forwardly passage of gases through said slots, and means for admitting and removing material to be dried.

3. A drier of the character described comprising an elongated housing, a flume centrally located within said housing, troughs located within said housing adjacent and on opposite sides of said flume, apertures formed by said flume troughs longitudinally of said housing, agitating devices mounted in said troughs, means for admitting heated gases to said flume, and means for providing upwardly and forwardly passage of gases through said apertures, and means for admitting and removing material to be dried.

4. A drier of the character described comprising an elongated housing, a hot gas flume located within said housing, a trough located within said housing, an elongated aperture in said flume adjacent said trough, an agitating device mounted in said trough, means for admitting heated gases to said flume and means for providing upwardly and forwardly passage of gases through said aperture.

5. A drier of the character described comprising an elongated housing, a hot gas flume located within said housing, a trough located within said housing, an elongated aperture in said flume adjacent said trough, an agitating device mounted in said trough, means for admitting heated gases to said flume and means for providing upwardly passage of gases through said aperture.

6. In a drier of the character described the combination of a drying chamber, an inverted V-shaped hot gas flume located within said chamber having an elongated aperture, material agitating means adjacent said aperture, and means for providing upwardly and forwardly passage of gases through said aperture into said chamber.

7. In a drier of the character described the combination of a drying chamber, an inverted V-shaped hot gas flume located within said chamber having an elongated aperture, material agitating means adjacent said aperture, and means for providing upwardly passage of gases through said aperture into said chamber.

8. In a drier of the character described the combination of a drying chamber, a hot gas flume located within said chamber having an elongated aperture, material agitating means adjacent said aperture, and means for providing upwardly and forwardly passage of gases through said aperture into said chamber.

9. In a drier of the character described the combination of a drying chamber, a hot gas flume located within said chamber having an elongated aperture, material agitating means adjacent said aperture, and means for providing upwardly passage of gases through said aperture into said chamber.

10. In a drier of the character described, the combination with a drying chamber, of means for admitting material to one end of said chamber, agitating means located within said chamber, a gas flume substantially coextensive in length with said chamber defining a portion of said chamber extending longitudinally thereof, a portion of said gas flume being located above said agitating means and inclined thereto for directing material into said means, means for directing hot gases into said flume, and means for directing hot gases from said flume into said chamber throughout substantially its entire length.

FRANK H. PEEK.